Figure 1:
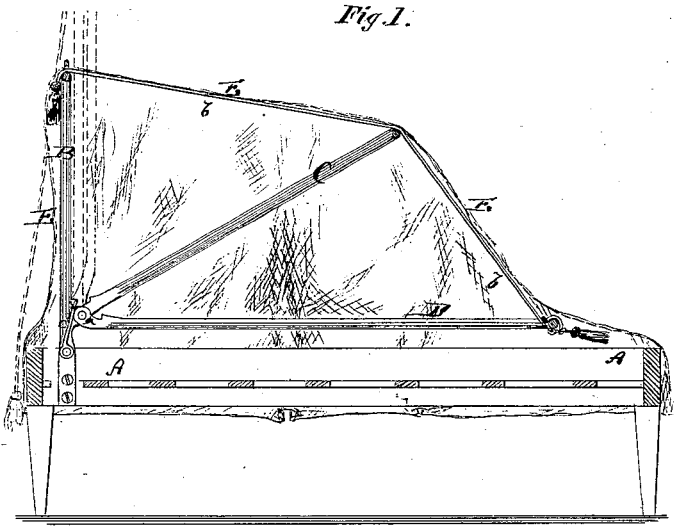
Figure 2:
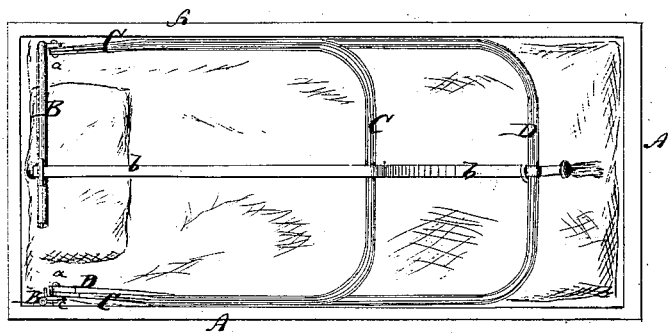
Figure 1:
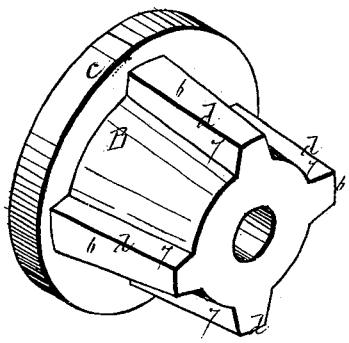
Figure 2:
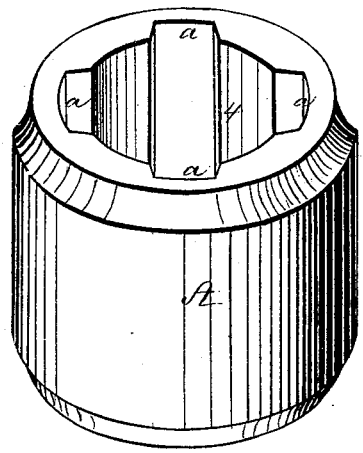
Figure 3:
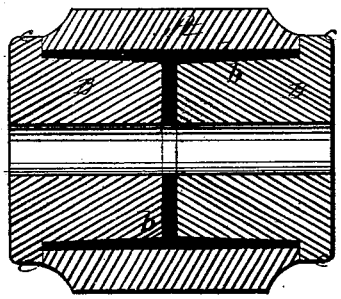

T. MASAC.
MOSQUITO BAR.

No. 108,611. Patented Oct. 25, 1870.

Witnesses:
John G. Becker
Philip E. Dietrich

Inventor:
T. Masac
Per Munn & Co.
Attorneys.

J. A. MAYNARD.
HUB FOR CARRIAGE.

No. 108,612.  Patented Oct. 25, 1870.